US009146356B2

(12) United States Patent
Ohara

(10) Patent No.: US 9,146,356 B2
(45) Date of Patent: Sep. 29, 2015

(54) OPTICAL DEVICE

(71) Applicant: OLYMPUS CORPORATION, Tokyo (JP)

(72) Inventor: Satoshi Ohara, Hachioji (JP)

(73) Assignee: OLYMPUS CORPORATION, Tokyo (JP)

( * ) Notice: Subject to any disclaimer, the term of this patent is extended or adjusted under 35 U.S.C. 154(b) by 0 days.

(21) Appl. No.: 14/081,346

(22) Filed: Nov. 15, 2013

(65) Prior Publication Data

US 2014/0072262 A1 Mar. 13, 2014

Related U.S. Application Data

(63) Continuation of application No. PCT/JP2012/063525, filed on May 25, 2012.

(30) Foreign Application Priority Data

May 27, 2011 (JP) .................. 2011-119145

(51) Int. Cl.
*G02B 6/34* (2006.01)
*G02B 6/26* (2006.01)
*G02B 6/38* (2006.01)

(52) U.S. Cl.
CPC *G02B 6/26* (2013.01); *G02B 6/264* (2013.01); *G02B 6/3877* (2013.01)

(58) Field of Classification Search
CPC ......... G02B 6/26; G02B 6/3877; G02B 6/264
USPC .............................................. 385/39, 72, 84
See application file for complete search history.

(56) References Cited

U.S. PATENT DOCUMENTS

| 4,193,665 | A | * | 3/1980 | Arnold | 385/72 |
| 4,832,435 | A | * | 5/1989 | Suzuki et al. | 385/83 |
| 4,850,670 | A | * | 7/1989 | Mathis et al. | 385/68 |
| 5,333,224 | A | * | 7/1994 | Kikuchi | 385/93 |
| 5,577,145 | A | * | 11/1996 | Musk | 385/88 |
| 5,675,681 | A | * | 10/1997 | Chiaretti et al. | 385/59 |
| 6,966,705 | B2 | * | 11/2005 | Sato et al. | 385/88 |
| 7,241,059 | B2 | * | 7/2007 | Yoshikawa | 385/92 |
| 2005/0220418 | A1 | * | 10/2005 | Demissy et al. | 385/55 |
| 2006/0251359 | A1 | * | 11/2006 | Morgenstern | 385/78 |

FOREIGN PATENT DOCUMENTS

JP   57056811 A  *  4/1982  ............... G02B 7/26
JP   2-77703 A      3/1990

(Continued)

OTHER PUBLICATIONS

International Search Report dated Jun. 26, 2012 issued in PCT/JP2012/063525.

*Primary Examiner* — Peter Radkowski
(74) *Attorney, Agent, or Firm* — Scully, Scott, Murphy & Presser, PC

(57) ABSTRACT

An optical device includes, for example, an optical fiber that guides light, a first holding member that holds the optical fiber, an optical element that functions by the light guided by the optical fiber being irradiated, and a second holding member that holds the optical element. The optical device further includes an optically coupled member elastically deformed by one end portion of the first holding member and one end portion of the second holding member being inserted to optically couple the optical fiber and the optical element by being elastically deformed.

18 Claims, 4 Drawing Sheets

(56) References Cited

FOREIGN PATENT DOCUMENTS

| | | | |
|---|---|---|---|
| JP | 03089407 A * | 4/1991 | |
| JP | 3-89407 U1 | 9/1991 | |
| JP | 6-27353 A | 2/1994 | |
| JP | 06027353 A * | 2/1994 | |
| JP | 2007-188059 A | 7/2007 | |

* cited by examiner

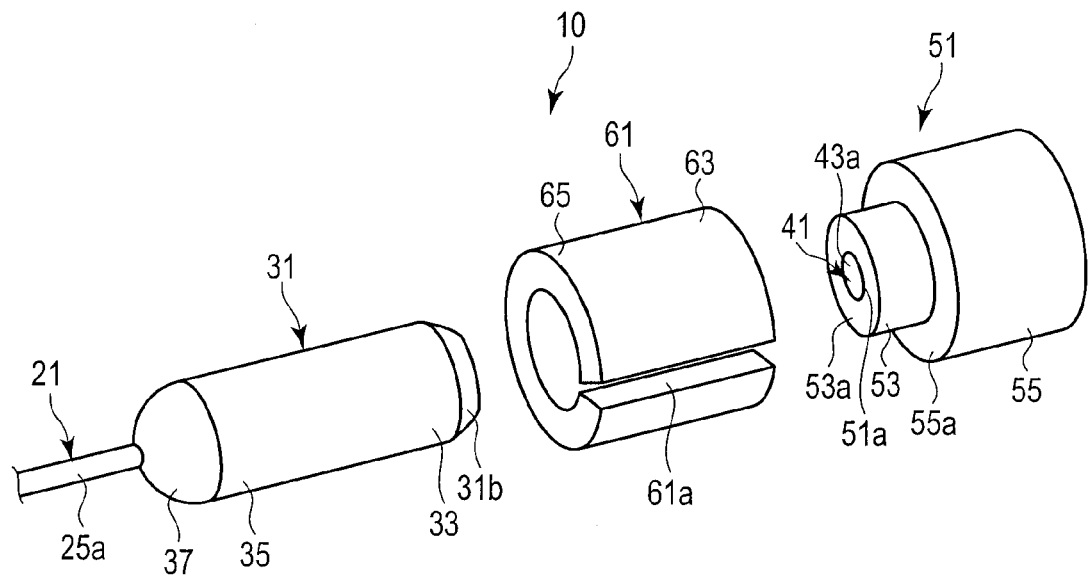
F I G. 1A
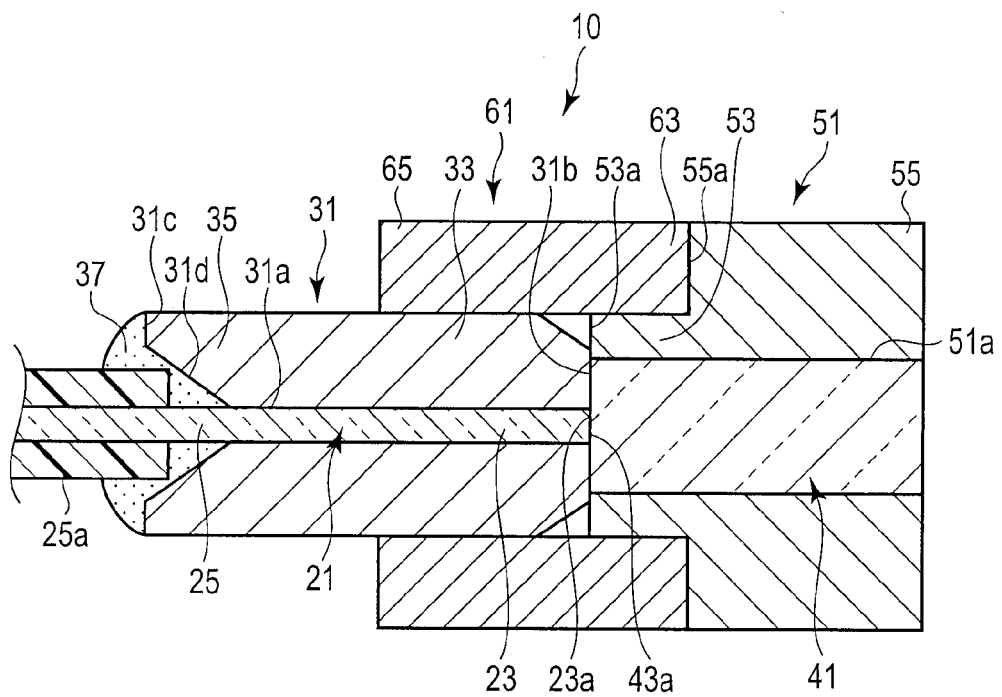
F I G. 1B

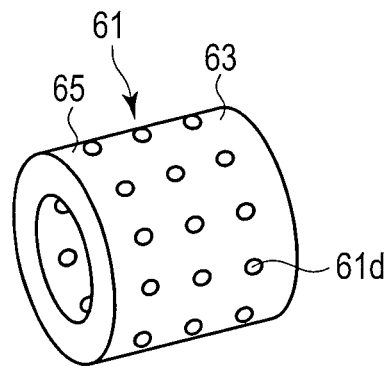
F I G. 2D
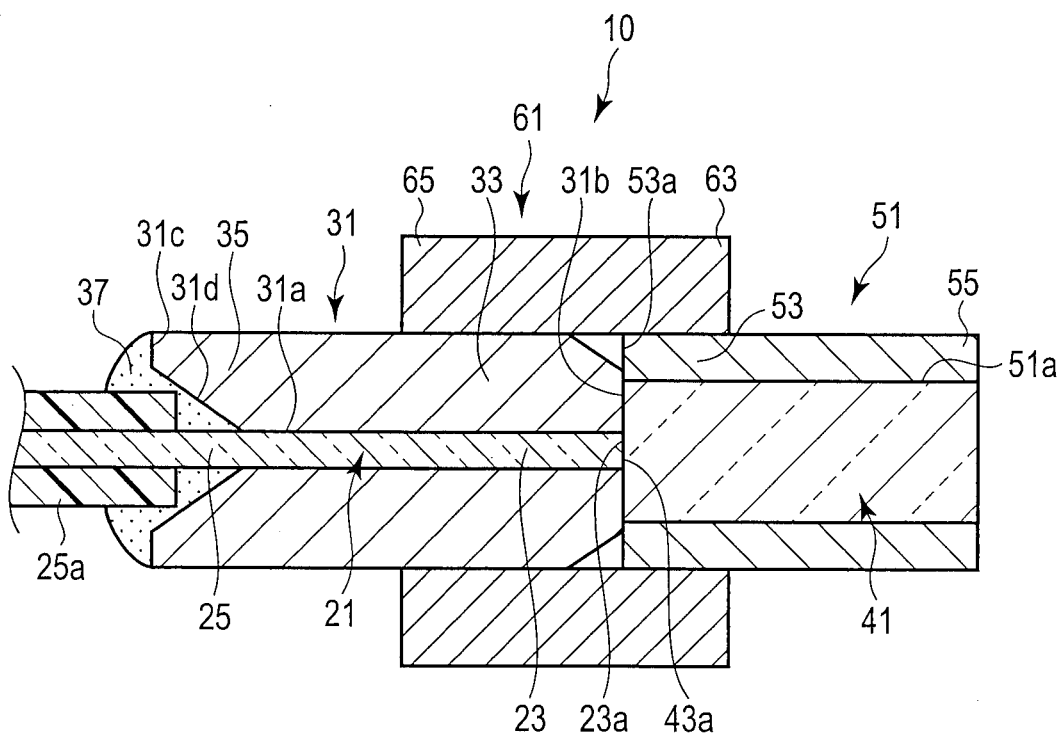
F I G. 3

OPTICAL DEVICE

CROSS-REFERENCE TO RELATED APPLICATIONS

This application is a Continuation Application of PCT Application No. PCT/JP2012/063525, filed May 25, 2012 and based upon and claiming the benefit of priority from prior Japanese Patent Applications No. 2011-119145, filed May 27, 2011, the entire contents of all of which are incorporated herein by reference.

BACKGROUND OF THE INVENTION

1. Field of the Invention

The present invention relates to an optical device having a light guide member and an optical element.

2. Description of the Related Art

For example, Jpn. Pat. Appln. KOKAI Publication No. 2007-188059 discloses an optical component that can be mounted on an end of a light guide member. In the optical component, a cap (holder) has an arrangement portion including a first fitting portion formed as a hole into which a ferrule is fitted and a second fitting portion formed as a hole communicatively connected to the first fitting portion (hole).

An optical fiber is inserted into the ferrule. The ferrule is fixed to the holder by at least one part of the side face of the ferrule being YAG-welded to the first fitting portion. Incidentally, the ferrule can be fixed to the holder by an adhesive, resistance welding, press-fitting, caulking or the like. The ferrule can also be fixed to the holder at an end of the ferrule.

An optical element (light conversion member) is disposed in the second fitting portion. The optical element is fixed to the holder by the optical element being fixed to the second fitting portion by melting-point glass or resin.

In Jpn. Pat. Appln. KOKAI Publication No. 2007-188059, in order for the ferrule to be fixed to the holder, it is necessary for the ferrule to be fitted into the holder in a state in which the ferrule is in close contact with the holder without creating a gap between the ferrule and the holder. In this state, the ferrule is fixed to the holder by YAG welding, adhesive, resistance welding, press-fitting, caulking or the like.

When the YAG welding or adhesive is used, a fixing strength between the ferrule and the holder increases as the above gap decreases. Thus, even when the YAG welding or adhesive is used, like when press-fitting is used, the inside diameter of the holder is made smaller than the outside diameter of the ferrule. Then in this state, the ferrule is press-fitted into the holder.

In this press-fitting process, however, a very large load is applied along an axial direction for press-fitting. When the load is applied to the ferrule and the holder, the optical fiber disposed in the ferrule and the optical element disposed in the holder are distorted. Then, the distortion leads to degradation in optical performance.

Particularly, the load for press-fitting increases with an increasing tolerance (interference) between the ferrule and the holder. Accordingly, as described above, distortion is more likely to occur in the optical fiber and optical element and optical performance is further degraded due to a load when an optical device is assembled. Therefore, an optical performance is more degraded due to the load during assembly with an increasing tolerance (interference).

BRIEF SUMMARY OF THE INVENTION

The present invention is made in view of the above circumstances and an object thereof is to provide an optical device that prevents the degradation in optical performance that occurs due to the load during assembly.

An aspect of an optical device of the present invention includes a light guide member that guides light, a first holding member that holds the light guide member, an optical element that functions by the light guided by the light guide member being irradiated, a second holding member that holds the optical element, and an optically coupled member elastically deformed by an end portion of the first holding member and an end portion of the second holding member being inserted to optically couple the light guide member and the optical element by being elastically deformed.

Advantages of the invention will be set forth in the description which follows, and in part will be obvious from the description, or may be learned by practice of the invention. Advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 1A relates to a first embodiment of the present invention and is an exploded perspective view of an optical device before optical coupling.

FIG. 1B is a schematic diagram of an optical connector after the optical coupling.

FIG. 2D is a diagram showing a modification of the optically coupled member.

FIG. 3 relates to a first modification of the first embodiment of the present invention and is a diagram showing a modification of a second holding member.

DETAILED DESCRIPTION OF THE INVENTION

Figure 2A:
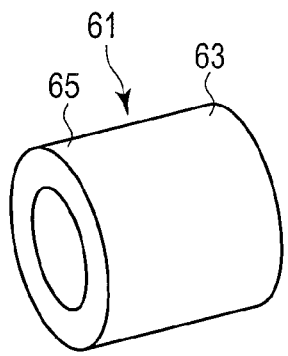
FIG. 2A is a diagram showing a modification of an optically coupled member.

An embodiment of the present invention will be described in detail below with reference to drawings.

First Embodiment

Configuration

The first embodiment will be described with reference to FIGS. 1A and 1B.

Optical Device 10

As shown in FIGS. 1A and 1B, an optical device 10 includes a light guide member like, for example, an optical fiber 21 that guides light, a first holding member 31 that holds the optical fiber 21, an optical element 41 that functions by the light guided by the optical fiber 21 being irradiated, and a second holding member 51 that holds the optical element 41.

Optical Fiber 21

As shown in FIG. 1B, the optical fiber 21 includes an emission end face 23a disposed at one end portion 23 of the optical fiber 21 to emit light. The other end portion 25 of the optical fiber 21 is coated with a coating layer 25a made of, for example, resin that protects the optical fiber 21. The optical fiber 21 is formed from, for example, glass or plastics.

First Holding Member 31

The first holding member 31 includes a ferrule formed from, for example, zirconia, glass, metal or the like. The metal includes, for example, nickel and SUS. The first holding member 31 has, for example, a cylindrical shape. More specifically, as shown in FIG. 1B, the first holding member 31 includes a through hole 31a on which disposed the center axis of the first holding member 31 and into which the optical fiber 21 is fitted or to which the optical fiber 21 is bonded. The through hole 31a passes through the first holding member 31 in an axial direction of the first holding member 31. The through hole 31a is disposed to allow the first holding member 31 to hold the optical fiber 21 and functions as a holding hole. The first holding member 31 holds the optical fiber 21 such that the emission end face 23a of the optical fiber 21 is disposed in the same plane as one end face 31b of the first holding member 31. In this case, the emission end face 23a and the one end face 31b are disposed so as to be positioned in the same plane. The one end face 31b is disposed at one end portion 33 of the first holding member 31.

The through hole 31a is open in the one end face 31b. In the one end face 31b, the periphery of the opening portion of the through hole 31a is formed as, for example, a plane. Also on the one end face 31b, the edge side of the first holding member 31 is formed in a taper shape so that the diameter thereof is reduced from the other end face 31c side of the first holding member 31 toward the one end face 31b side in the axial direction of the first holding member 31. Thus, the one end portion 33 of the first holding member 31 has a truncated conic shape whose diameter is reduced from the other end face 31c side of the first holding member 31 toward the one end face 31b side of the first holding member 31 in the axial direction of the first holding member 31. As shown in FIG. 1B, the one end portion 33 is pressed-fitted into an optically coupled member 61 described later and so functions as an insertion portion inserted into the optically coupled member 61. Because the one end portion 33 is pressed-fitted into the optically coupled member 61, the outside diameter of the one end portion 33 is larger than the inside diameter of the optically coupled member 61.

The first holding member 31 also includes a guide port portion 31d disposed in the other end face 31c of the first holding member 31 and communicatively connected to the through hole 31a. The guide port portion 31d guides the one end portion 23 of the optical fiber 21 to the through hole 31a so that the optical fiber 21 is inserted and fitted into the through hole 31a. The guide port portion 31d and the other end face 31c are disposed at the other end portion 35 of the first holding member 31. The guide port portion 31d has a truncated conic shape whose diameter is reduced from the other end face 31c of the first holding member 31 toward the one end face 31b of the first holding member 31 and is formed in an inclined taper shape. Incidentally, the coating layer 25a described above is disposed up to the side of the other end face 31c of the first holding member 31, more specifically, up to the neighborhood of the guide port portion 31d and is not inserted into the through hole 31a. Thus, the one end portion 23 of the optical fiber 21 is exposed from the coating layer 25a.

In the guide port portion 31d, a bonding member 37 that bonds the other end portion 25 side of the optical fiber 21 including the coating layer 25a to the first holding member 31 is disposed. The bonding member 37 is disposed also in the coating layer 25a. The bonding member 37 includes, for example, an optical adhesive and an adhesive of silicon, epoxy and the like.

Optical Element 41

The optical element 41 is formed from, for example, ceramics or glass. The optical element 41 has, for example, a cylindrical shape. However, the optical element 41 is not limited to the cylindrical shape and may have a conic shape, truncated conic shape, hemispherical shape, or parabolic shape. The diameter of the optical element 41 is larger than that of, for example, the optical fiber 21. The optical element 41 includes, for example, one plane end face 43a. The one end face 43a abuts on the emission end face 23a to allow the optical fiber 21 and the optical element 41 to be optically coupled. The one end face 43a functions as an incidence end face on which light emitted from the emission end face 23a is incident. The one end face 43a is larger than the emission end face 23a.

The optical element 41 is disposed coaxially with the optical fiber 21 and optically coupled with the optical fiber 21. In this case, at least the center axis of the one end face 43a is disposed coaxially with the center axis of the emission end face 23a so that the one end face 43a is optically connected to the emission end face 23a.

Second Holding Member 51

The second holding member 51 is formed from a metal like, for example, nickel, SUS, and brass. The second holding member 51 is a different body from the first holding member 31. The second holding member 51 is formed in a stepped shape and so has, for example, a convex outer shape. The second holding member 51 as described above includes one end portion 53 and the other end portion 55 larger (thicker) than the one end portion 53. The one end portion 53 and the other end portion 55 have, for example, a cylindrical shape. In this case, the one end portion 53 is formed as a small diameter portion and the other end portion 55 is formed as a large diameter portion. The one end portion 53 is connected to the other end portion 55.

As shown in FIG. 1B, the one end portion 53 is pressed-fitted into the optically coupled member 61 described later and so functions as an insertion portion inserted into the optically coupled member 61. Because the one end portion 53 is pressed-fitted into the optically coupled member 61, the outside diameter of the one end portion 53 is larger than the inside diameter of the optically coupled member 61. Because the one end portion 53 of the second holding member 51 functioning as an insertion portion is inserted into the optically coupled member 61, the one end portion 53 is thinner than other portions like the other end portion 55 disposed outside the optically coupled member 61. Incidentally, the outside diameter of the one end portion 53 is substantially the same as the outside diameter of the one end portion 33 of the first holding member 31 inserted into the optically coupled member 61.

As shown in FIG. 1B, the one end portion 53 is opposed to the one end portion 33 of the first holding member 31 when the optical fiber 21 and the optical element 41 are optically coupled each other. The one end portion 53 includes one plane end face 53a abutting on the one end face 31b of the first holding member 31. The other end portion 55 includes one plane end face 55a abutting on one end portion 63 of the optically coupled member 61 described later. The outside diameter of the other end portion 55 is larger than the inside diameter of the optically coupled member 61. In addition, the outside diameter of the other end portion 55 is substantially the same as the outside diameter of the optically coupled member 61 or smaller than the outside diameter of the optically coupled member 61.

The second holding member 51 includes a through hole 51a on which disposed the center axis of the second holding member 51 and into which the optical element 41 is fitted or to which the optical element 41 is bonded. The through hole 51a passes through the second holding member 51 (the one end portion 53 and the other end portion 55) in the axial direction of the second holding member 51. The through hole 51a is disposed to allow the second holding member 51 to hold the optical element 41 and functions as a holding hole. The second holding member 51 holds the optical element 41 such that the one end face 43a of the optical element 41 is disposed in the same plane as one end face 53a of the one end portion 53. In this case, the one end face 43a and the one end face 53a are disposed so as to be positioned in the same plane.

Optically Coupled Member 61

The optical device 10 further includes the optically coupled member 61 elastically deformed by the one end portion 33 of the first holding member 31 and the one end portion 53 of the second holding member 51 being inserted to optically couple the optical fiber 21 and the optical element 41 by the elastic deformation. The optically coupled member 61 is formed from a spring material, for example, zirconia, nickel, or phosphor bronze and has an elastic force for elastic deformation.

When the one end portion 33 of the first holding member 31 and the one end portion 53 of the second holding member 51 are inserted into the optically coupled member 61, the one end portion 33 of the first holding member 31 and the one end portion 53 of the second holding member 51 are press-fitted into the optically coupled member 61 to fit into the optically coupled member 61 such that the emission end face 23a and the one end face 43a abut on each other. The one end portion 53 of the second holding member 51 is press-fitted from the one end portion 63 of the optically coupled member 61 and the one end portion 33 of the first holding member 31 is press-fitted from the other end portion 65 of the optically coupled member 61. The inner circumferential surface of the optically coupled member 61 is in close contact with the outer circumferential surface of the one end portion 33 functioning as an insertion portion and the outer circumferential surface of the one end portion 53 functioning as an insertion portion by press-fit.

In addition, the optically coupled member 61 is elastically deformed so that the diameter in the diameter direction is increased during press-fitting by the first holding member 31 (one end portion 33) and the second holding member 51 (one end portion 53) being pressed and tightened in the diameter direction by the optically coupled member 61, the first holding member 31 (one end portion 33) and the second holding member 51 (one end portion 53) being aligned in, for example, the diameter direction by the optically coupled member 61, and the optical fiber 21 (emission end face 23a) and the optical element 41 (one end face 43a) being coaxially disposed by the optically coupled member 61 so that the emission end face 23a and the one end face 43a are optically coupled mutually and the optical fiber 21 and the optical element 41 are coupled by the optically coupled member 61. Thus, the optically coupled member 61 is also a positioning member and a coupling member.

The optically coupled member 61 as described above is formed such that a portion of the cross section of the optically coupled member 61 is notched in order for the optically coupled member 61 to promote elastic deformation depending on the elastic force described above. The optically coupled member 61 is formed such that a portion of the cross section of the optically coupled member 61 is notched in order for the optically coupled member 61 to weaken the force to tighten the one end portion 33 of the first holding member 31 and the one end portion 53 of the second holding member 51 in the diameter direction during press-fitting. Thus, the optically coupled member 61 is formed, for example, as a substantially cylindrical member having a cross section a portion of which is notched continuously in the axial direction. The cross section is formed in a plane direction orthogonal to the axial direction of the optically coupled member 61. The cross section is also formed in, for example, a C shape. Thus, the optically coupled member 61 is formed, for example, as a substantially cylindrical member having a cross section in a C shape continuously in the axial direction. Thus, the optically coupled member 61 is formed as a split sleeve in which a portion of the circle is notched. Hence, the optically coupled member 61 has a slit 61a disposed along the axial direction of the optically coupled member 61 and passing through the optically coupled member 61 in the axial direction. The slit 61a passes through the optically coupled member 61 in the thickness direction of the optically coupled member 61. The slit 61a is formed by a portion of the cross section of the optically coupled member 61 being notched.

Load

Next, the load on the first holding member 31 (one end portion 33) and the second holding member 51 (one end portion 53) along the axial direction of the optical device 10 when the first holding member 31 and the second holding member 51 are press-fitted into the optically coupled member 61 will be described.

The optically coupled member 61 is elastically deformed such that, for example, the diameter in the diameter direction is increased by press-fitting. Thus, the first holding member 31 (one end portion 33) and the second holding member 51 (one end portion 53) can be press-fitted into the optically coupled member 61 even if the load in the present embodiment is smaller than the load when the optically coupled member 61 is not elastically deformed such that the diameter in the diameter direction is increased.

The optically coupled member 61 is a different body from the first holding member 31 and the second holding member 51. More specifically, the optically coupled member 61 is a different body from the one end portion 33 functioning as an insertion portion in the first holding member 31 and the one end portion 53 functioning as an insertion portion in the second holding member 51. Thus, as described above, the one end portion 53 of the second holding member 51 can be press-fitted into the optically coupled member 61 from the one end portion 63 of the optically coupled member 61 and the one end portion 33 of the first holding member 31 can be press-fitted into the optically coupled member 61 from the one end portion 63 of the optically coupled member 61. In other words, the one end portion 63 of the optically coupled member 61 is not fixed to the one end portion 53 of the second holding member 51 and the other end portion 65 of the optically coupled member 61 is not fixed to the one end portion 33 of the first holding member 31. That is, both end portions of the optically coupled member 61 are not fixed end portions, but free end portions. Therefore, if the load in the present embodiment is smaller than the load when the optically coupled member 61 is integrated with one of the first holding member 31 and the second holding member 51, the first holding member 31 (one end portion 33) and the second holding member 51 (one end portion 53) can be press-fitted into the optically coupled member 61.

The force to tighten the one end portion 33 of the first holding member 31 and the one end portion 53 of the second holding member 51 in the diameter direction by the optically coupled member 61 in the present embodiment during press-fitting is called a first tightening force. The force to tighten the one end portion 33 of the first holding member 31 and the one end portion 53 of the second holding member 51 in the diameter direction by the optically coupled member 61 when, in contrast to the present embodiment, the optically coupled member 61 is formed in, for example, a cylindrical shape without a portion of the cross section of the optically coupled member 61 being notched is called a second tightening force. The first tightening force in the present embodiment is adjusted to be smaller than the second tightening force by, for example, the slit 61a being disposed. Therefore, even if the load in the present embodiment is smaller than the load when the optically coupled member 61 is formed in a cylindrical shape without a portion of the cross section of the optically coupled member 61 being notched, the first holding member 31 (one end portion 33) and the second holding member 51 (one end portion 53) can be press-fitted into the optically coupled member 61.

Therefore, the optically coupled member 61 controls, adjusts, and inhibits the load on the first holding member 31 and the second holding member 51 along the axial direction of the optical device 10 by press-fitting during press-fitting by elastic deformation, the optically coupled member 61 being a different body from the first holding member 31 and the second holding member 51, and the first tightening force adjusted by a portion of the cross section being notched.

Assembly Method

Next, the assembly method of the present embodiment will be described.

The optical element 41 is disposed in the through hole 51a and the second holding member 51 holds the optical element 41.

In addition, the optical fiber 21 is disposed from the guide port portion 31d to the through hole 31a and the bonding member 37 is bond the optical fiber 21 including the coating layer 25a disposed in the guide port portion 31d to the first holding member 31. The first holding member 31 thereby holds the optical fiber 21.

The one end portion 53 of the second holding member 51 functioning as an insertion portion is press-fitted into the optically coupled member 61 so that the one end face 55a of the other end portion 55 abuts on the one end portion 63 of the optically coupled member 61.

Next, the one end portion 33 of the first holding member 31 functioning as an insertion portion is press-fitted into the optically coupled member 61 so that the emission end face 23a and the one end face 43a abut on each other.

When each of the one end portion 53 of the second holding member 51 and the one end portion 33 of the first holding member 31 is press-fitted into the optically coupled member 61, the optically coupled member 61 is elastically deformed in, for example, the diameter direction. In addition, the elastic deformation is promoted by the slit 61a. Then, the optically coupled member 61 presses the first holding member 31 (one end portion 33) and the second holding member 51 (one end portion 53) in the diameter direction by the elastic deformation. Accordingly, the optically coupled member 61 aligns the first holding member 31 and the second holding member 51 in, for example, the diameter direction to coaxially dispose the optical fiber 21 (emission end face 23a) and the optical element 41 (one end face 43a) to couple the optical fiber 21 and the optical element 41. Therefore, the optical fiber 21 (emission end face 23a) and the optical element 41 (one end) are optically coupled.

When the first holding member 31 (one end portion 33) and the second holding member 51 (one end portion 53) are press-fitted into the optically coupled member 61, the optically coupled member 61 is elastically deformed such that the diameter thereof is increased in, for example, the diameter direction. Thus, a smaller load is sufficient in the present embodiment during press-fitting compared with the load when no elastic deformation in the diameter direction of the optically coupled member 61 occurs. Therefore, distortion is prevented from being caused in the optical fiber 21 and the optical element 41 by the load and optical performance is prevented from being degraded by the load during assembly.

The optically coupled member 61 is a different body from the first holding member 31 and the second holding member 51. Thus, a smaller load is sufficient in the present embodiment during press-fitting compared with the load when the optically coupled member 61 is integrated with one of the first holding member 31 and the second holding member 51. Therefore, distortion is prevented from being caused in the optical fiber 21 and the optical element 41 by the load and optical performance is further prevented from being degraded by the load during assembly.

The first tightening force is made smaller than the second tightening force by, for example, the slit 61a being disposed. Thus, a smaller load is sufficient in the present embodiment during press-fitting compared with the load when the optically coupled member 61 is formed in a cylindrical shape without a portion of the cross section of the optically coupled member 61 being notched. Therefore, distortion is prevented from being caused in the optical fiber 21 and the optical element 41 by the load and optical performance is prevented from being degraded by the load during assembly.

Effect

In the present embodiment, as described above, the load can be made smaller than the load when the optically coupled member 61 is not elastically deformed in the diameter direction by the optically coupled member 61 being elastically deformed such that the diameter thereof is increased in, for example, the diameter direction when the first holding member 31 (one end portion 33) and the second holding member 51 (one end portion 53) are press-fitted into the optically coupled member 61. Therefore, in the present embodiment, distortion can be prevented from being caused in the optical fiber 21 and the optical element 41 by the load and optical performance is prevented from being degraded by the load during assembly.

Also in the present embodiment, the optically coupled member 61 is formed such that a portion of the cross section of the optically coupled member 61 is notched. Accordingly, in the present embodiment, elastic deformation can be promoted and, as described above, the load can be made smaller than the load when the optically coupled member 61 is not elastically deformed in the diameter direction.

Also in the present embodiment, the optically coupled member 61 is formed such that a portion of the cross section of the optically coupled member 61 is notched. Accordingly, in the present embodiment, the first tightening force can be made smaller than the second tightening force and the load can be made smaller than the load when the optically coupled member 61 is formed in, for example, a cylindrical shape without a portion of the cross section of the optically coupled member 61 being notched. Therefore, in the present embodiment, distortion can further be prevented from being caused in the optical fiber 21 and the optical element 41 by the load and optical performance can further be prevented from being degraded by the load during assembly.

Also in the present embodiment, the optically coupled member 61 is a different body from the first holding member 31 and the second holding member 51. Thus, in the present embodiment, both end portions of the optically coupled member 61 can be made free end portions, instead of fixed end portions. Also in the present embodiment, as described above, the load can be made smaller than the load when the optically coupled member 61 is integrated with one of the first holding member 31 and the second holding member 51. Therefore, in the present embodiment, distortion can further be prevented from being caused in the optical fiber 21 and the optical element 41 by the load and optical performance can further be prevented from being degraded by the load during assembly.

Assume, for example, that the optically coupled member 61 is formed in, for example, a cylindrical shape without a portion of the cross section of the optically coupled member 61 being notched and the optically coupled member 61 is integrated with one of the first holding member 31 and the second holding member 51.

In this case, it is necessary to process the outside diameter of the first holding member 31, the outside diameter of the second holding member 51, and the inside diameter of the optically coupled member 61 with high accuracy to reduce, like in the present embodiment, the load on the first holding member 31 and the second holding member 51 by press-fitting. However, this leads to higher processing costs of the optical device 10.

Also in this case, if the processing accuracy decreases to cut processing costs, the tolerance (interference) of the outside diameter of the first holding member 31, the outside diameter of the second holding member 51, and the inside diameter of the optically coupled member 61 increases. Thus, the load for press-fitting increases. Accordingly, as described above, distortion is caused in the optical fiber 21 and the optical element 41 by the load and optical performance is degraded due to the load during assembly.

In the present embodiment, however, even if the tolerance (interference) increases, in other words, the processing accuracy is not high, the load can be made smaller as described above so that distortion can be prevented from being caused in the optical fiber 21 and the optical element 41 by the load and optical performance can be prevented from being degraded by the load during assembly. Also in the present embodiment, as described above, distortion can be prevented from being caused in the optical fiber 21 and the optical element 41 by the load and optical performance can be prevented from being degraded by the load during assembly while processing costs are cut.

Also in the present embodiment, the load on the first holding member 31 and the second holding member 51 along the axial direction of the optical device 10 can be controlled by press-fitting during press-fitting by elastic deformation, the first tightening force adjusted by a portion of the section being notched, and the optically coupled member 61 being a different body from the first holding member 31 and the second holding member 51. Therefore, in the present embodiment, it becomes possible to prevent distortion from being caused in the optical fiber 21 and the optical element 41 by the load and optical performance from be degraded by the load during assembly. Also in the present embodiment, the optical fiber 21 and the optical element 41 can be prevented from being damaged by the load.

Also in the present embodiment, as described above, variations of the load during press-fitting that change depending on the shape and size of the first holding member 31, the second holding member 51, and the optically coupled member 61 can be reduced. Also in the present embodiment, as described above, the load during press-fitting that changes depending on the shape and size of the first holding member 31, the second holding member 51, and the optically coupled member 61 can be made smaller.

Also in the present embodiment, after the one end portion 53 of the second holding member 51 is press-fitted into the optically coupled member 61, the one end portion 33 of the first holding member 31 having the same diameter as the one end portion 53 is press-fitted into the optically coupled member 61 and therefore, variation in the fitting width can be reduced, which thereby stabilizes the load. Incidentally, in the present embodiment, the one end portion 53 of the second holding member 51 and the one end portion 33 of the first holding member 31 may be press-fitted into the optically coupled member 61 at the same time.

Also in the present embodiment, when the one end portion 53 of the second holding member 51 is press-fitted into the optically coupled member 61, the one end face 55a of the other end portion 55 abuts on the one end portion 63 of the optically coupled member 61. Accordingly, in the present embodiment, the second holding member 51 can easily be positioned with respect to the optically coupled member 61. Also in the present embodiment, after the one end portion 53 of the second holding member 51 is press-fitted into the optically coupled member 61, the one end portion 33 of the first holding member 31 is press-fitted into the optically coupled member 61 such that the emission end face 23a and the one end 43a abut on each other. Thus, in the present embodiment, the optically coupled member 61 can easily be positioned with respect to the second holding member 51 and the first holding member 31.

Also in the present embodiment, the one end portions 33, 53 can be press-fitted into the optically coupled member 61 by making the outside diameter of the one end portions 33, 53 larger than the inside diameter of the optically coupled member 61 so that the coupling strength to the optical fiber 21 and the optical element 41 can be increased Also in the present embodiment, the optical fiber 21 and the optical element 41 can easily be positioned and shifts during optical coupling can be prevented by making the outside diameter of the one end portion 33 substantially equal to the outside diameter of the one end portion 53.

Also in the present embodiment, with the one end portions 33, 53 functioning as insertion portions, positioning for optical coupling can be maintained with high accuracy. Also in the present embodiment, with the one end portions 33, 53 functioning as insertion portions, axes of the optical fiber 21 and the optical element 41 can easily be aligned.

Also in the present embodiment, the second holding member 51 has, for example, a convex outer shape and the outside diameter of the other end portion 55 is substantially the same as the outside diameter of the optically coupled member 61 or smaller than the outside diameter of the optically coupled member 61. Therefore, in the present embodiment, the size of the optical device 10 can be made smaller while the strength of the second holding member 51 is ensured.

Also in the present embodiment, the optical device 10 can easily be assembled by press-fitting the one end portions 33, 53 into the optically coupled member 61 without using an adhesive.

Also in the present embodiment, high reliability with respect to heat can be ensured by forming the first holding member 31, the second holding member 51, and the optically coupled member 61 from the same material (for example, nickel) without using an adhesive and in this state, strong optical coupling can be achieved.

Also in the present embodiment, to further ensure coupling strength to the first holding member 31, the second holding member 51, and the optically coupled member 61, the optical device 10 may further include a cover member that covers these members in close contact.

In the present embodiment, the optically coupled member 61 is a split sleeve, but does not need to be limited to the split sleeve.

For example, the optically coupled member 61 may be formed, as shown in FIG. 2A, as a cylindrical member if the optically coupled member is capable of elastic deformation and is a different body from the first holding member 31 and the second holding member 51. Also in this case, the present embodiment can achieve the above effect.

Figure 2B:
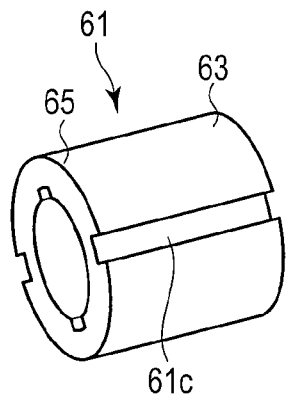
FIG. 2B is a diagram showing a modification of the optically coupled member.

Alternatively, for example, the optically coupled member 61 may be formed as a cylindrical member having a cross section a portion of which is notched. Thus, as shown in FIG. 2B, the optically coupled member 61 may include, for example, a groove portion 61c disposed along the axial direction of the optically coupled member 61. The groove portion 61c may be recessed from the outer circumferential surface to the inner circumferential surface of the optically coupled member 61 or from the inner circumferential surface to the outer circumferential surface of the optically coupled member 61. The arrangement position and shape of the groove portion 61c are not particularly limited.

Figure 2C:
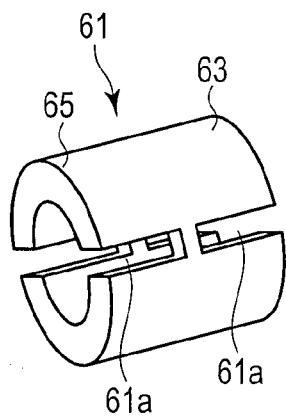
FIG. 2C is a diagram showing a modification of the optically coupled member.

Also as shown in FIG. 2C, the optically coupled member 61 may include the slit 61a that does not pass through the optically coupled member 61 in the axial direction and stops halfway through. In this case, the optically coupled member 61 may include a plurality of the slits 61a. The arrangement position and shape of the slit 61a are not particularly limited.

Also as shown in FIG. 2D, the optically coupled member 61 may include a hole 61d passing through the optically coupled member 61 in the thickness direction of the optically coupled member 61. The arrangement position and shape of the hole 61d are not particularly limited.

Alternatively, the optically coupled member 61 may be formed as a cylindrical member including at least one of the slit 61a, the groove portion 61c, and the hole 61d.

Therefore, if a portion of the cross section is notched, elastic deformation can be promoted and the first tightening force can reliably be made smaller than the second tightening force.

First Modification

Next, the first modification of the present embodiment will be described with reference to FIG. 3.

In the second holding member 51 in the present modification, the one end portion 53 has substantially the same diameter as the other end portion 55. Because the one end portion 53 is pressed-fitted into the optically coupled member 61, the outside diameter of the one end portion 53 and the outside diameter of the other end portion 55 are larger than the inside diameter of the optically coupled member 61. In addition, the outside diameter of the one end portion 53 and the outside diameter of the other end portion 55 are substantially the same as the outside diameter of the one end portion 33 of the first holding member 31 inserted into the optically coupled member 61.

That is, the second holding member 51 has a cylindrical shape. Because the one end portion 53 is pressed-fitted into the optically coupled member 61, the outside diameter of the second holding member 51 is larger than the inside diameter of the optically coupled member 61. The outside diameter of the second holding member 51 is substantially the same as the outside diameter of the one end portion 33 of the first holding member 31 inserted into the optically coupled member 61.

Accordingly, in the present modification, the second holding member 51 can easily be processed and costs can be reduced.

Second Modification

Next, the second modification of the present embodiment will be described with reference to FIGS. 4A and 4B.

The optical device 10 in the present modification includes a fixing mechanism 71 that fixes at least one of the first holding member 31 and the second holding member 51 to the optically coupled member 61.

The fixing mechanism 71 includes at least one of, for example, laser welding, a soldering joint, an adhesive, and a surface activated joint.

Figure 4A:
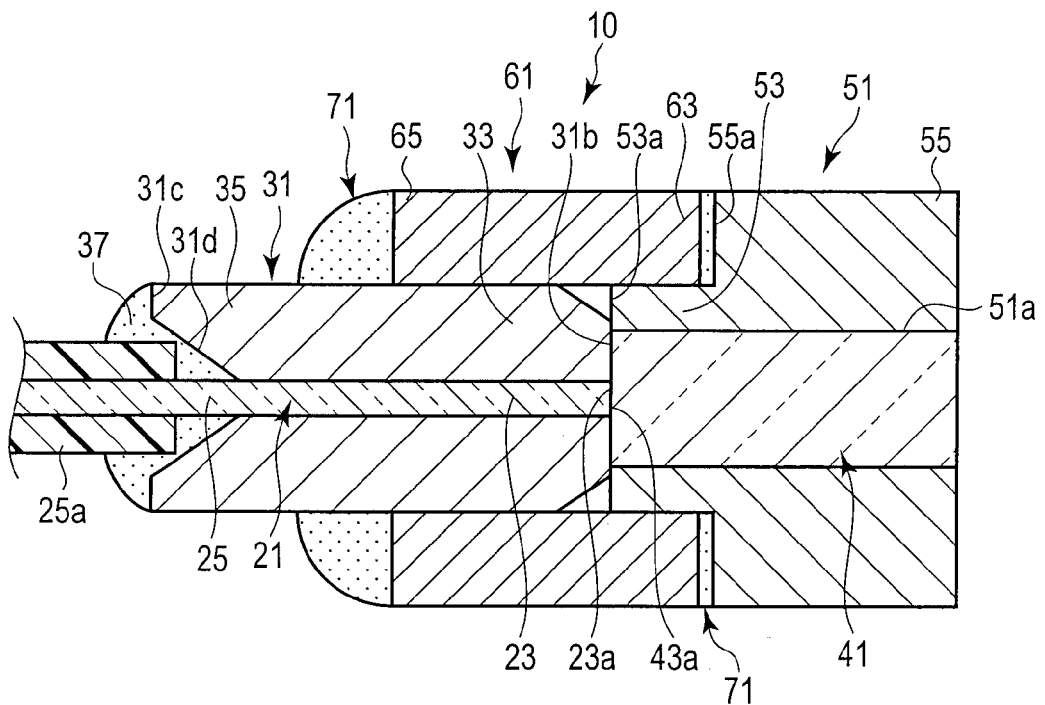
FIG. 4A relates to a second modification of the first embodiment of the present invention and is a diagram in which at least one of a first holding member and the second holding member is coupled to the optically coupled member by a coupling mechanism.

As shown in FIG. 4A, laser welding, a soldering joint, and an adhesive are implemented/disposed on, for example, the one end face 55a of the other end portion 55 and the one end portion 63 to fix the second holding member 51 and the optically coupled member 61. Also, laser welding, a soldering joint, and an adhesive are implemented/disposed on, for example, the outer circumferential surface of the first holding member 31 and the other end portion 65 to fix the first holding member 31 and the optically coupled member 61.

Figure 4B:
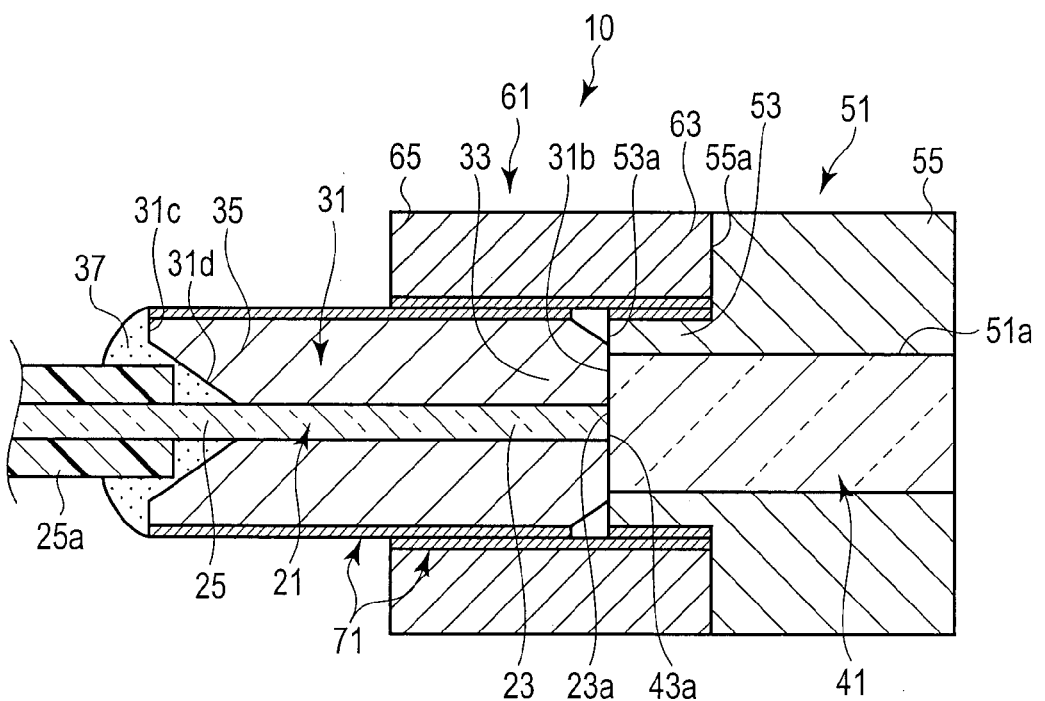
FIG. 4B relates to the second modification of the first embodiment of the present invention and is a diagram in which at least one of the first holding member and the second holding member is coupled to the optically coupled member by the coupling mechanism.

As shown in FIG. 4B, a surface activated joint, for example, an Au film is implemented/disposed on the inner circumferential surface of the optically coupled member 61 and at least one of the outer circumferential surface of the first holding member 31 and the outer circumferential surface of the one end portion 53 of the second holding member 51.

Accordingly, in the present modification, the fixing strength can be improved by the fixing mechanism 71 so that a still higher fixing strength can be obtained. Also in the present modification, even if the size of the optical device 10 is made smaller, a high fixing strength can be ensured by the fixing mechanism 71.

Also in the present modification, laser welding, a soldering joint, and an adhesive shown in FIG. 4A are disposed on the outer side of the optical fiber 21 and the optical element 41 and on the outer side of the optically coupled member 61 and therefore, a high fixing strength can be ensured while optical coupling efficiency is secured.

The present invention is not limited to the above embodiment unchanged and can be embodied by modifying elements without deviating from the gist thereof in the stage of working. In addition, various inventions can be formed by appropriately combining a plurality of elements disclosed in the above embodiment.

What is claimed is:

1. An optical device comprising:
    a light guide member that guides light;
    a first holding member that holds the light guide member;
    an optical element that functions by the light guided by the light guide member being irradiated;
    a second holding member that holds the optical element; and
    an optically coupled member elastically deformable in a diameter direction by an end portion of the first holding member and an end portion of the second holding member being inserted into opposite ends of the optically coupled member,
    wherein the optically coupled member presses both the first holding member and the second holding member in the diameter direction of the optically coupled member to optically align the light guide member relative to the optical element in the diameter direction,
    a face at the end portion of the first holding member is on a same plane as a face of an end of the light guide member inserted into the first holding member; and
    a face at the end portion of the second holding member is on a same plane as a face of an end of the optical element inserted into the second holding member.

2. The optical device according to claim 1, wherein the light guide member and the optical element are coaxially disposed and optically coupled to each other.

3. The optical device according to claim 2, wherein the first holding member, the second holding member, and the optically coupled member are each different bodies.

4. The optical device according to claim 3, wherein the optically coupled member is formed as a cylinder member having a cross section a portion of which is notched continuously in an axial direction.

5. The optical device according to claim 4, wherein the cross section is formed as a C shape.

6. The optical device according to claim 3, wherein the optically coupled member is formed as a cylinder member.

7. The optical device according to claim 3, wherein the optically coupled member is formed as a cylinder member including at least one of a slit, a groove portion, and a hole.

8. The optical device according to claim 5, wherein in the one end portion of the first holding member and the one end portion of the second holding member inserted into the optically coupled member, an outside diameter of the one end portion of the first holding member and the outside diameter of the one end portion of the second holding member are larger than an inside diameter of the optically coupled member.

9. The optical device according to claim 1, wherein the outside diameter of the one end portion of the first holding member is substantially equal to the outside diameter of the one end portion of the second holding member.

10. The optical device according to claim 9, wherein the one end portion of the second holding member is thinner than the other end of the second holding member disposed outside the optically coupled member.

11. The optical device according to claim 8, further comprising: a fixing mechanism that fixes at least one of the first holding member and the second holding member to the optically coupled member.

12. The optical device according to claim 11, wherein the fixing mechanism includes at least one of laser welding, a soldering joint, an adhesive, and a surface activated joint.

13. The optical device according to claim 1, wherein:
    the end portion of the first holding member and the end portion of the second holding member are inserted into the opposite ends of the optically coupled member such that the face of the end of the light guide member abuts the face of the end of the optical element.

14. The optical device according to claim 13, wherein an area of the face of the end of the light guide member is smaller than the face of the end of the optical element.

15. The optical device according to claim 1, wherein:
    the first holding member includes a through hole for holding an end portion of the light guide member; and
    the light guide member has a coating layer formed on an outer periphery of the light guide member in portions of a longitudinal length of the light guide member excluding the end portion of the light guide member.

16. The optical device according to claim 15, wherein:
    the light guide member includes a transition portion between the portions having the coating layer and the end portion of the light guide member; and
    the first holding member includes a concavity formed at another end of the first holding member for accommodating the transition portion.

17. The optical device according to claim 16, further comprising a bonding member disposed in the concavity.

18. The optical device according to claim 17, wherein the bonding member is an adhesive.

* * * * *